Patented June 19, 1945

2,378,715

UNITED STATES PATENT OFFICE 2,378,715

FIREPROOFING COMPOSITIONS

Martin Leatherman, Hyattsville, Md.

No Drawing. Application May 28, 1942,
Serial No. 444,920

2 Claims. (Cl. 106—15)

(Granted under the act of March 3, 1883, as
amended April 30, 1928; 370 O. G. 757)

The invention described herein may be manufactured and used by or for the Government for governmental purposes without payment to me of any royalty thereon.

This invention relates to fireproofing compositions, and particularly to compositions of the type in which thermally unstable materials are broken down in the presence of heat to evolve flameproofing gases such as hydrogen chloride and carbon dioxide. The invention is particularly directed to the imparting of fire and flameproofing properties to fibrous materials having a cellulose base, although it has application to the impregnation of other fibrous materials and to the coating or painting of materials, such as wood, which are not impregnated.

In my application Serial No. 396,537, filed June 4, 1941, now Patent Number 2,326,233, dated August 10, 1943, I have disclosed and claimed a fireproofing composition embodying chlorinated organic materials combined with zinc carbonate and suitable solvents, pigments, and wetters, to impart fireproofing characteristics to fibrous materials and the like. That invention is predicated upon the ability of chlorinated organic materials, such as chlorinated paraffin, to evolve hydrogen chloride gas at temperatures well below 300° C., and also upon the ability of the zinc carbonate to evolve carbon dioxide at temperatures of 300° C. and above.

The effectiveness of the above composition as a fireproofing agent is due largely to the hydrogen chloride which is liberated by highly chlorinated organic materials at temperatures approaching the ignition point of most fabrics, particularly those of cellulosic nature having an ignition point of approximately 300° C. The composition disclosed in that application is highly effective with chlorinated materials having a chlorine content amounting to about 50 to 60 percent of the weight of the organic material, but loses its effectiveness rapidly as the chlorine content is reduced.

It is known that antimony trioxide is effective as an ingredient of flameproofing compositions used with chlorinated organic materials. However, that material is scarce and present compositions require substantial quantities of this ingredient for effective fibrous protection. This material is also toxic, especially when present in substantial quantity.

The object of the present invention is to reduce as far as possible the amount of scarce and costly ingredients employed in fireproofing compositions. More particularly, it aims to reduce the amount of chlorinated organic material used or to make the composition more effective with such materials when their chlorine content is greatly reduced. Another object is to reduce the amount of antimony oxide required in order to make available quantities of this material adequate to meet wartime demands for fireproofing compositions, and to reduce the toxicity of compositions where it is employed.

The present invention is based essentially upon two discoveries. One is that monocalcium chlorophosphate is thermally unstable, and at temperatures of 125 to 200° C., and above, will liberate hydrogen chloride gas which is an effective flameproofing agent, and the second is that flameproofing accelerators when used in combination with chlorinated organic materials or with monocalcium chlorophosphate greatly reduce the amount of fireproofing material required to effectively protect combustible fibrous materials. This effect is most striking in that it can be used in fireproofing compositions containing antimony oxide to reduce the amount of such oxide required to even less than 2% of the composition.

Monocalcium chlorophosphate may be considered as a hydrated double salt of calcium chloride and monocalcium phosphate $$(CaH_4P_2O_8 \cdot CaCl_2 \cdot 2H_2O)$$

as a hydrated double salt of dicalcium phosphate and hydrochloric acid $(CaHPO_4 \cdot CHl \cdot H_2O)$, or as monocalcium chlorophosphate $(CaClH_2PO_4 \cdot H_2O)$.

This material is of low cost and may be manufactured readily from acid-digested steamed bone and phosphoric acid or from calcium chloride and phosphoric acid. It is strictly an inorganic compound and is unaffected by actinic light to which chlorinated organic materials are inherently very susceptible. When this material is heated to temperatures above 125° C., it decomposes with the evolution of hydrochloric acid. This evolution increases up to 150° C. and above.

The flameproofing accelerators which are useful in compositions embodying the present invention are antimony trioxide, arsenic trioxide, lead dioxide, stannic oxide and the arsenates of zinc, calcium, lead, magnesium, manganese, and equivalent materials. The preferred materials are lead dioxide, antimony and arsenic trioxide, and the arsenates of calcium, lead and magnesium. These materials, through some unknown action analogous to that of a catalyst, permit great reduction in the percentage of composition needed to fireproof combustible fibrous materials.

While antimony trioxide has been used in combination with chlorinated organic materials as a fireproofing composition, the amount of such trioxide required in the past has been from 5 to 10 percent of the weight of the fibrous material beeing fireproofed. In compositions embodying the present invention, the presence of even less than 2 percent of antimony trioxide is approximately as effective as the compositions of the prior art, particularly as set forth in my patent, referred to above. Whereas satisfactory results using the composition of that application required a chlorine content of 50 percent or above, in the chlorinated organic material, the present composition is fully effective with chlorinated organic materials containing percentages of chlorine as low as 41 to 46 percent. The use of these materials not only reduces the amount of material such as chlorinated paraffin or its equivalent, or of antimony oxide, but it permits lowering the take-on of the finished fabric appreciably.

The effectiveness of my novel composition resides in the complex actions and interactions exhibited by the ingredients under the influence of heat. When fibrous materials impregnated with my composition are subjected to ignition temperatures the following phenomena occur: the chlorinated organic material and the monocalcium chlorophosphate evolve hydrochloric acid which is an effective fire retarding agent. At least some of the evolved hydrochloric acid reacts with the zinc carbonate to form zinc chloride with the liberation of carbon dioxide which is likewise an excellent fire retarding agent. At 300° C. which approximates the combustion temperature of cellulose, zinc carbonate decomposes to form more carbon dioxide and zinc oxide. Zinc oxide thus formed acts as a dehydration catalyst for cellulose and causes the splitting of cellulose into water and carbon with the prevention of flaming. Likewise, the other oxides mentioned above are powerful cellulose dehydration catalysts and any one of them greatly reinforces the action of the nascent zinc oxide. As a result of these various actions and interactions it becomes possible to fireproof a 12 ounce tenting duck with not more than a 50 percent add-on, that is, for every 100 pounds of fabric not more than 50 pounds of my composition is required.

A necessary ingredient of the present composition is a suitable wetting agent for the solids employed. Among the agents suitable for this purpose are aluminum stearate, zinc naphthenate, cadmium naphthenate, fatty acids, oxidizing oils, such as linseed or tung oil, and other similarly acting materials. Certain of these agents serve only to assist the penetration and distribution of the composition in fibrous materials impregnated with it. However, the drying oils are valuable not only as wetters, but may also be used as vehicles in the preparation of fireproofing paints.

Although not necessary to operativeness of the invention, it will frequently be desirable to use inert pigments in the composition. Such pigments preferably comprise earth colors such as sienna, umber, ochre, and the like, iron oxides, carbon black, metallic particles and metallic oxides, or other metallic pigments. These pigments serve not only to give decorative effects to the composition, but also to protect the chlorinated organic material, when it is used, from the decomposing effect of actinic light.

A transient ingredient of my composition is a dispersion medium which may be water in which the composition is dispersed, or an organic solvent in which the chlorinated organic material dissolves and the other ingredients remain suspended. This ingredient serves to regulate the amount of composition deposited during the treating of fibrous materials.

Although a preferred chlorinated organic material is chlorinated paraffin, I may use admixed therewith, or in various combinations severally or separately other chlorinated resinous organic materials such as polyvinyl chloride, co-polymers of vinyl chloride and vinyl acetate, polymerized chlorinated paracymene, chlorinated vegetable oils, or any other similarly thermally unstable chlorinated resinous organic material.

The term "resinous" as employed herein is intended to include all of the classes of materials just enumerated where the materials have physical properties that are resin-like in character at congealing temperatures.

It will be obvious from the above that the monocalcium chlorophosphate has the unique advantages not only of reducing the amount of chlorinated material required, and of supplementing the action of the chlorinated material, but also of evolving hydrogen chloride. The material is cheap and readily available and since it is a solid it may be dispersed like a pigment.

In some instances as in the making of fireproofing paints, the non-drying chlorinated organic constituent of the composition may be replaced largely or entirely by drying oils in suitable proportions. Such a composition is effective as a fire retardant, non-tacky paint for wooden or other surfaces. Where the chlorinated organic constituents are omitted, it will usually be advisable to increase the amount of monocalcium chlorophosphate used.

The following are typical examples of compositions embodying the present invention. These examples are based on the amount of ingredients required for the treatment of 12 ounce duck, and may be varied in accordance with the weight of the material to be treated. As is known, the proportion of the composition will be greater as the weight of the fabric decreases. The percentages given are on a solvent free basis.

Example I

| | Percent |
|---|---|
| Zinc carbonate | 20.0 |
| Inert pigments | 22.0 |
| Monocalcium chlorophosphate | 26.1 |
| Arsenic trioxide | 3.1 |
| Chlorinated paraffin | 26.8 |
| Zinc naphthenate | 2.0 |
| Mineral spirits as required for grinding and dilution. | |
| | 100.0 |

Example II

| | Percent |
|---|---|
| Zinc carbonate | 23.2 |
| Inert pigment | 26.6 |
| Antimony trioxide | 5.0 |
| Aluminum stearate | 2.0 |
| Chlorinated paraffin | 43.2 |
| Mineral spirits as required for grinding and dilution. | |
| | 100.0 |

*Example III*

| | Percent |
|---|---|
| Zinc carbonate | 20.0 |
| Antimony trioxide | 8.5 |
| Inert pigment | 28.6 |
| Aluminum stearate | 5.7 |
| Chlorinated paraffin | 37.2 |
| Mineral spirits as required for grinding and dilution. | |
| | 100.0 |

*Example IV*

| | Percent |
|---|---|
| Zinc carbonate | 23.2 |
| Inert opaque pigments | 26.6 |
| Arsenic trioxide | 5.0 |
| Aluminum stearate | 2.0 |
| Chlorinated paraffin | 43.2 |
| Mineral spirits as required for grinding and dilution. | |
| | 100.0 |

*Example V*

| | Percent |
|---|---|
| Zinc carbonate | 16.6 |
| Monocalcium chlorophosphate | 16.6 |
| Lead dioxide | 6.7 |
| Inert opaque pigments | 25.5 |
| Aluminum stearate | 2.3 |
| Chlorinated paraffins | 32.3 |
| Mineral spirits as required for grinding and dilution. | |
| | 100.0 |

The above examples illustrate the flexibility of the compositions embodying the invention without restricting it to the precise proportions stated. In general it may be said that the composition for most effective action should contain approximately the following percentage of ingredients:

| | Percent |
|---|---|
| Zinc carbonate | 10–25 |
| Monocalcium chlorophosphate | 10–30 |
| Flame-proofing accelerator ($PbO_2$, $As_2O_3$, $Sb_2O_3$) | 3–10 |
| Chlorinated organic material | 20–44 |
| Wetting agent (aluminum stearate, zinc naphthenate etc.) | 1.5–8 |
| Inert pigment | 22–28 |

As will be observed from the examples given above the amount of zinc carbonate and chlorinated organic material used is less when the monocalcium chlorophosphate is present.

The preferred manner of preparation of the compositions is to grind the ingredients, suitably thinned as by mineral spirits, on a roller mill of the type used in preparing paints. It may then be applied to the material to be treated by brushing, spraying or dipping. In applying the composition to fabrics or other fibrous materials, the solvent thinner is adjusted to give the desired residue of composition in the fibrous material after drying. The amount of thinner required will vary according to the method used for applying the composition to the fibrous materials. A preferred method is to immerse the fibrous material, and to squeeze it heavily in a padding machine and then to dry it on steam heated rolls. The compositions may also be brushed or sprayed on, when used as fire retardant paints for wood and other surfaces.

While it is indicated above that the ingredients are dissolved in a volatile medium such as mineral spirits, it is also practicable to disperse the materials in water in order to avoid the use of flammable solvents. The term dispersion medium is used in a generic sense to cover a medium functioning either to dissolve or suspend the solids.

Compositions of the above character are effective in imparting to the material treated not only excellent fireproofing and flameproofing characteristics but cause great economy in the use of antimony trioxide and chlorinated materials. The effect is not only to economize in the use of scarce materials, but to make available for use materials of inferior character such as lightly chlorinated organic materials, which have not been effective using compositions of the prior art.

Another important advantage of the invention is the fact that by proper selection of materials satisfactory fireproofing of materials can be obtained with the addition of a smaller amount of composition than has been required heretofore for the same results.

What is claimed is:

1. A fireproofing composition comprising zinc carbonate, thermally unstable chlorinated organic material, monocalcium chlorophosphate, a flameproofing accelerator of the class consisting of arsenic and antimony trioxide, lead dioxide, stannic oxide and the arsenates of zinc, calcium, lead, magnesium and manganese, a dispersion medium, and a wetting agent for the solids.

2. A fireproofing composition comprising the following ingredients in approximately the proportions stated: zinc carbonate 10–20 per cent; monocalcium chlorophosphate 10–30 per cent; a flame-proofing accelerator from the class consisting of arsenic and antimony trioxide, lead dioxide, stannic oxide, and the arsenates of zinc, calcium, lead, magnesium and manganese 3–10 per cent; thermally unstable chlorinated organic material 20–44 per cent; wetting agent 1.5–8 per cent; and inert pigment 22–28 per cent.

MARTIN LEATHERMAN.